(12) United States Patent
Kube

(10) Patent No.: US 9,789,489 B2
(45) Date of Patent: Oct. 17, 2017

(54) METHOD AND DEVICE FOR CONTROLLING A ROTATIONAL SPEED OF A DRIVE

(71) Applicant: Siemens Aktiengesellschaft, München (DE)

(72) Inventor: Andreas Kube, Aachen (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 14/761,254

(22) PCT Filed: Aug. 6, 2013

(86) PCT No.: PCT/EP2013/066474
§ 371 (c)(1),
(2) Date: Jul. 15, 2015

(87) PCT Pub. No.: WO2014/111174
PCT Pub. Date: Jul. 24, 2014

(65) Prior Publication Data
US 2015/0349697 A1 Dec. 3, 2015

(30) Foreign Application Priority Data
Jan. 16, 2013 (DE) .................. 10 2013 200 578

(51) Int. Cl.
*B02C 15/00* (2006.01)
*B02C 25/00* (2006.01)
*H02P 31/00* (2006.01)

(52) U.S. Cl.
CPC ............ *B02C 25/00* (2013.01); *B02C 15/007* (2013.01); *H02P 31/00* (2013.01)

(58) Field of Classification Search
CPC ........ B02C 25/00; B02C 15/007; H02P 31/00
See application file for complete search history.

(56) References Cited

U.S. PATENT DOCUMENTS 4,160,200 A * 7/1979 Imamura .................. G01D 5/36
318/616
4,298,113 A * 11/1981 Shaver .................... B02C 17/24
192/103 F (Continued)

FOREIGN PATENT DOCUMENTS

CN 202621230 U 12/2012
EP 0 350 818 A2 1/1990

(Continued)

*Primary Examiner* — Shawki S Ismail
*Assistant Examiner* — Muhammad S Islam
(74) *Attorney, Agent, or Firm* — Henry M. Feiereisen LLC

(57) ABSTRACT

In a method and a corresponding device for controlling a rotational speed of a drive driving a shaft, the rotational speed is controlled by a control device which is supplied with a control deviation calculated based on a desired value and an actual value for the rotational speed. The actual value for the rotational speed of the shaft is measured on the shaft with a first sensor and at least one additional sensor and the actual value is calculated from a weighted average of the individual measured values for the rotational speed obtained from the first and the at least one additional sensor.

11 Claims, 4 Drawing Sheets

(56) References Cited

U.S. PATENT DOCUMENTS

| | | | | |
|---|---|---|---|---|
| 4,847,555 | A * | 7/1989 | Stammer | G01P 3/481 |
| | | | | 318/400.42 |
| 6,036,162 | A * | 3/2000 | Hayashi | F16F 15/00 |
| | | | | 248/550 |
| 6,218,800 | B1 * | 4/2001 | Akkermans | G05B 19/21 |
| | | | | 318/560 |
| 6,808,248 | B1 * | 10/2004 | Brugu | B41J 19/202 |
| | | | | 347/19 |
| 2002/0190709 | A1 * | 12/2002 | Frederick | G01D 5/24438 |
| | | | | 324/207.2 |
| 2008/0309260 | A1 * | 12/2008 | Kanai | H02P 25/06 |
| | | | | 318/38 |
| 2010/0193616 | A1 | 8/2010 | Berger | |
| 2010/0321006 | A1 * | 12/2010 | Suzuki | G01D 5/145 |
| | | | | 324/207.25 |

FOREIGN PATENT DOCUMENTS

| | | |
|---|---|---|
| JP | S63 218831 A | 9/1988 |
| WO | WO 2010/015564 A1 | 2/2010 |

\* cited by examiner

METHOD AND DEVICE FOR CONTROLLING A ROTATIONAL SPEED OF A DRIVE

CROSS-REFERENCES TO RELATED APPLICATIONS

This application is the U.S. National Stage of International Application No. PCT/EP2013/066474, filed Aug. 6, 2013, which designated the United States and has been published as International Publication No. WO 2014/111174 and which claims the priority of German Patent Application, Serial No. 10 2013 200 578.4, filed Jan. 16, 2013, pursuant to 35 U.S.C. 119(a)-(d).

BACKGROUND OF THE INVENTION

The invention relates to a method for controlling a rotational speed of a drive, especially a heavy-duty drive, and to a device working in accordance with the method. The drive drives a shaft and the rotational speed is controlled by means of a control device which is supplied with a control deviation calculated by means of a predetermined or predeterminable desired value for the rotational speed and an actual value for the rotational speed.

Vertical mills for pulverizing brittle materials, for example cement raw material, are sometimes inclined to strong mechanical torsional vibrations in the drive train. To be able to counteract these torsional vibrations using control technology, for controlling a heavy-duty drive driving such a mill, precise information about the current angle of rotation or about its temporal derivations, i.e. for example the rotational speed is required at at least one point of the drive train. The rotor of the motor comes into consideration for example for recording measured values. Conventional angular position encoders are based on a relative movement of a measuring scale being detected by a scanning unit. The scanning unit in such cases is suitably disposed at a fixed location and the measuring scale is attached to the circumference of the shaft for example.

The accuracy of such a measurement, for example a measurement of the rotational speed, suffers however from a relative movement between measuring scale and scanning unit being composed of an overlaying of different movement components. In practice these movement components can be the result of play or other irregularities of the support of the shaft, a flexing of the shaft as result of non-roundness, ovality or a circumferential eccentricity of the shaft as well as installation or manufacturing inaccuracies of the measuring scale.

In controlling the rotational speed of the shaft, in addition to the rotation, all other movement components are to be considered as fault components. An inaccurate measurement signal necessarily leads to a poor quality of control. Specifically when a fault component has a periodicity, for example a fault component resulting from an eccentricity of the measuring scale, this can lead to significant problems. If the periodic fault component with at least one of its spectral line components encounters an inherent frequency of the control system, this can fuel a resonance.

Because vertical mill drives and other heavy-duty drives have as yet not been highly dynamically controlled, this problem has not played any role to date and accordingly, to the best of the inventor's knowledge, has not been investigated.

SUMMARY OF THE INVENTION

An object of the invention is to specify an option for measuring the rotational speed which avoids the resonance dangers outlined above.

The object is achieved in accordance with the invention by a method for controlling a rotational speed of the drive, especially a heavy-duty drive, wherein the drive drives a shaft, i.e. imparts a rotation to it, and the rotational speed is controlled by means of a control device, wherein the control device is supplied with a control deviation calculated from a predetermined or predeterminable desired value for the rotational speed and an actual value for the rotational speed, by an actual value for an angle of rotation of the shaft or one of its temporal derivations, especially an actual value for the rotational speed of the shaft, being detected on the shaft by means of a first sensor as well as by means of at least one further sensor, and that the actual value for the rotational speed is formed on the basis of the weighted overall view of the individual measured values received from the first and the at least one further sensor, especially measured rotational speed values.

The indirect or direct detection of the rotational speed of the shaft by detecting an angle of rotation of the shaft or of one of the temporal derivations of the angle of rotation are equivalent forms of embodiment for obtaining a measured value able to be used for controlling the rotational speed of the drive. In order not to make the subsequent text less legible the further description is continued on the basis of detecting the rotational speed. However this is always to be read so that, with the at least two sensors, an angle of rotation can also be measured as an alternative and from this, through the temporal derivation, the rotational speed can be determined or that for example a rotation acceleration can be measured in each case and from this, through temporal integration, the rotational speed can likewise be determined.

The aforementioned object is likewise achieved with a device having means for carrying out the method. Such a device for controlling a rotational speed of the drive, especially a heavy-duty drive, in which the drive drives a shaft, i.e. imparts rotation to said shaft and in which a control device to which a control deviation calculated from a predetermined or predeterminable desired value for the rotational speed and an actual value for the rotational speed is able to be supplied is provided for controlling a rotational speed, is characterized by the shaft being assigned a first sensor and at least one further sensor each for recording a rotational speed measured value and by the actual value of the rotational speed being able to be formed on the basis of a weighted overall view of the individual measured rotational speed values obtained from the first and the at least one further sensor and being formed during operation of the device for example as an arithmetic mean.

The advantage of the invention lies in the fact that, with a multiple recording of measured values for rotational speed of the shaft, although each measured value may contain periodic fault components, with a weighted overall view, for example on formation of a mean, said components entirely or at least partly cancel each other out.

Advantageous embodiments of the invention are the subject matter of the dependent claims. References used in such cases indicate the further embodiment of the subject matter of the main claim by the features of the respective dependent claim. They are not to be understood as dispensing with the aim of an independent physical protection for the feature combinations of the referenced dependent claims. Furthermore in respect of a layout of the claims for a more detailed description of the claim in a subsequent claim it is to be assumed that this type of restriction is not present in the respective preceding claims. Finally it is to be pointed out that the method specified here can also be developed in accordance with the dependent device claims and vice versa.

In a form of embodiment of the device the first sensor and the further sensor or each further sensor are disposed distributed equidistantly along the outer circumference of the shaft and the actual value of the rotational speed is able to be formed as an arithmetic mean from the individual measured rotational speed values obtained from the first and the at least one further sensor and is formed during operation of the device as the arithmetic mean.

An arithmetic mean or an arithmetic mean value is an especially simple form of a mean value and is thus considered as an especially easily-implementable form of a weighted overall view of the individual measured rotational speed values obtained from the first and the at least one further sensor.

If, in addition to the first sensor, the device comprises precisely one further sensor, i.e. precisely two sensors and the further sensor is disposed opposite the first sensor on the shaft, especially directly opposite it, the formation of the arithmetic mean is simplified in accordance with the number of measured values to be averaged and half the sum of the measured values able to be obtained by the two sensors is produced as the actual value of the rotation speed. In addition an arrangement of the two sensors exactly opposite one another or at least approximately exactly opposite one another is comparatively easy to realize.

The approach presented here for use for heavy-duty drives, especially drives as are used in a vertical mill for example for pulverizing cement raw material is basically also considered for drives of a different type. To this extent the invention is thus also a method for compensating for faults in the detection of a rotational speed of the shaft, wherein the shaft, especially a shaft of a heavy-duty drive, is assigned a sensor, wherein the method is characterized in that the shaft is assigned at least one further sensor and that a measured value for the rotational speed of the shaft is formed as a weighted overall view, especially as an arithmetic mean of measured values obtained from the first and the at least one further sensor. The invention is thus also a corresponding device, namely for example a rotational speed detector, to compensate for faults in the detection of a rotational speed of a shaft, wherein the device comprises a sensor assigned to a shaft, especially a shaft of a heavy-duty drive, and is characterized in that the device comprises at least one further sensor assigned to the shaft and that the measured value for the rotational speed of the shaft is able to be formed as a weighted overall view, especially as an arithmetic mean from individual measured values obtained from the first and the at least one further sensor. For such a "generalized" method and a corresponding generalized device all forms of embodiment for the method and the device for controlling a rotational speed of a drive, especially a heavy-duty drive, are considered as specific forms of embodiment.

An exemplary embodiment of the invention is explained below with reference to the drawing. Objects or elements which correspond to each other are provided with the same reference characters in all figures.

The exemplary embodiment or each exemplary embodiment is not to be understood as a restriction of the invention. Actually amendments and modifications are possible within the framework of the present disclosure, especially such variations and combinations which for example, through combination or amendment of individual features or elements or method steps described in conjunction with the general or specific description part as well as contained in the claims and/or the drawing are able to be derived by the person skilled in the art in respect of achieving the object and through combinable features lead to new subject matter or to new method steps or sequences of method steps.

DETAILED DESCRIPTION OF PREFERRED EMBODIMENTS

Figure 1:
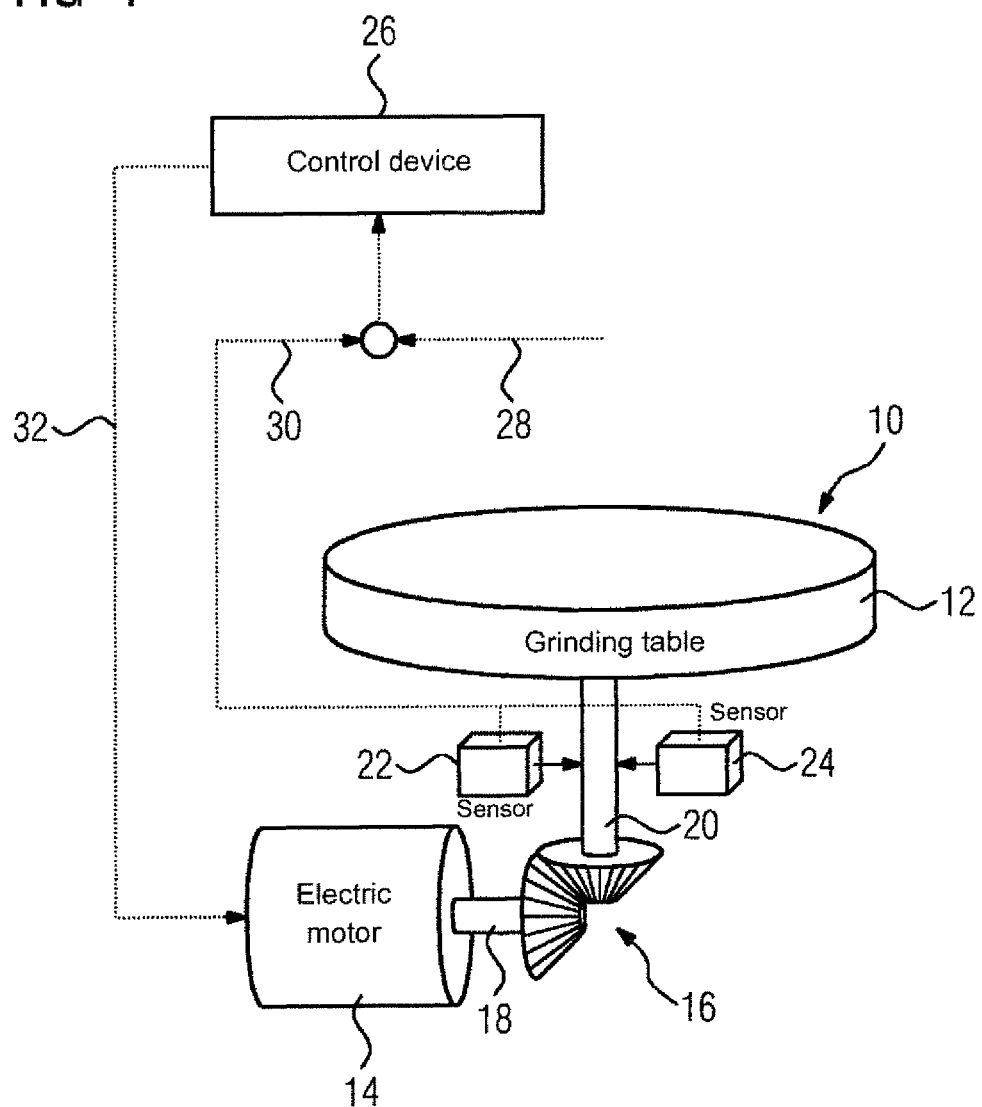
FIG. 1 shows a schematically greatly simplified diagram of a vertical mill with a shaft driven by a heavy-duty drive, by means of which rotation is imparted to a grinding wheel of the vertical mill.

The diagram in FIG. 1 is a greatly simplified schematic diagram of a vertical mill 10 for pulverizing brittle materials, for example cement raw material. The vertical mill 10 comprises a grinding table 12 able to be rotated about the vertical. The grinding table 12 is driven by a motor, especially an electric motor 14 and in the example shown here, by a transmission 16 located between electric motor 14 and grinding table 12. The transmission 16 is shown here, without foregoing any further general applicability, as a bevel gear. The transmission 16 can also include such a bevel gear or the like and an upstream planetary gear.

The vertical mill 10 comprises at least one driven shaft 18, 20. In the diagram in FIG. 1 the vertical mill 10 includes a motor shaft 18 and a grinding table shaft 20. All of the means for transmitting the drive force of the electric motor 14 to the grinding table 12 are designated the drive train. The drive train here includes electric motor 14, the motor shaft 18, the transmission 16 and the grinding table shaft 20.

Overall the vertical mill 10 is a system capable of vibrating. In operation of the vertical mill 10 the electric motor 14 causes the grinding table 12 to rotate. The shaft or each shaft 18, 20 as well as the transmission 16, are characterized by a certain mechanical elasticity, so that torsional vibrations can be produced within the vertical mill 10. In the operation of the vertical mill 10 however a speed or rotational speed of the grinding table 12 which is as constant as possible is required. Therefore the rotational speed of the grinding table 12 is detected indirectly or directly and is used to control the rotational speed of the grinding table 12 or to control the speed of the electric motor 14.

For this at least one corresponding sensor 22, 24 is provided. In the form of embodiment shown in FIG. 1 the sensor 22, 24 is assigned to the grinding table shaft 20 and detects its speed of rotation accordingly. The grinding table shaft 20 will be referred to below as the shaft 20 for short.

To control the rotational speed a control device 26 is provided. This is supplied in a manner known per se with a control deviation calculated from a predetermined or pre-determinable desired value 28 for the rotational speed and an actual value 30 for the rotational speed. The control device 26, on the basis of the control deviation, in a manner likewise known per se, outputs a manipulated variable 32 for controlling the electric motor 14.

The diagram in FIG. 1 already shows a sensor 22 and at least one further sensor 24, as is proposed here. Conventionally a single sensor 22 is used for detecting the rotational speed, so that the description below initially proceeds from a single sensor 22 and a detection of the rotational speed with a single sensor 22.

The detection of the rotational speed at the grinding table shaft 20 (or as an alternative directly at the grinding table 12) has the effect that possible rotational speed deviations as a result of vibrations are also detected directly. The detected rotational speed can then be used for an especially precise regulation of the rotational speed of the grinding table 12. The description is continued here, for reasons of simplification, on the basis of the diagram in FIG. 1 for recording a measured value at the grinding table shaft 20. Naturally the same measured value can also be recorded in relation to the motor shaft 18, without individual reference being made to this. The alternate option for measured value recording at the motor shaft 18 is accordingly always to be read as being part of the following description.

The diagram in FIG. 1 does not show any bearings and the like. Such bearings are naturally present. Despite them, during operation of the vertical mill 10 an eccentricity of the shaft 20 or also a vibration of the shaft 20 can be produced in the radial direction. The diagrams in FIG. 2 and FIG. 3 show this in a schematically simplified presentation based on a cross-section through the shaft 20.

Figure 2:
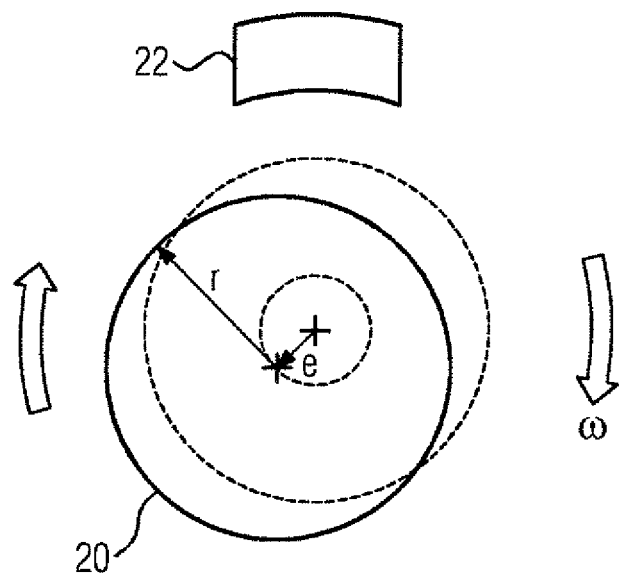
FIG. 2.

The diagram in FIG. 2 shows the situation with an eccentricity of the shaft 20. The circle shown with a solid line represents a momentary recording of the position of the eccentric shaft 20. A first (larger) circle shown with a dashed line represents a position of the shaft 20 without eccentricity. The second smaller circle represented with a dashed line shows the track of the moving location of the center point of the eccentric shaft 20.

It is taken as read that in a detection of the rotational speed of the shaft 20 by means of the sensor 22, with an eccentricity of the shaft 20, the measured value determined for the rotational speed is prone to errors.

Figure 3:
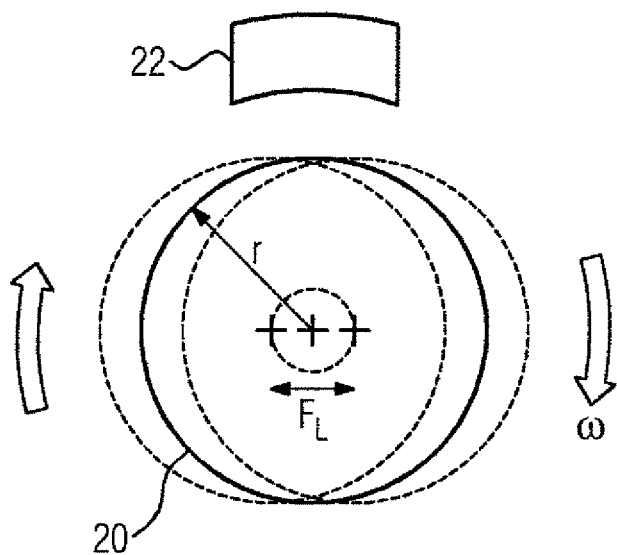
FIG. 3 show a schematically simplified overhead view of an eccentricity or a vibration of a shaft, to illustrate the error resulting therefrom in a measurement technology detection of the rotational speed of the shaft.

The diagram in FIG. 3 shows an example of the circumstances for a shaft 20 vibrating in a radial direction. The circle represented with a solid line and the two circles represented with dashed lines with the same radii represent by way of example momentary recordings of possible horizontal positions of the vibrating shaft 20. A further inner circle represents a boundary line for the area of the moving location of the center point of the eccentric shaft 20.

Here too it is taken as read that, in the detection of the rotational speed of the shaft 20 by means of the sensor 22, with a vibrating shaft 20 the measured value determined for the rotational speed is prone to errors.

In practice an eccentricity of the shaft 20 and also a vibration of the shaft 20 can also occur in combination, so that the effects presented add to one another.

For a highly precise control of the rotational speed of the grinding table 12 or of the speed of the electric motor 14 a correspondingly precise measured value for the momentary rotational speed of the grinding table 12 (actual value 30 of the rotational speed) is of decisive importance. Specifically with an eccentricity of the shaft 20 and/or a vibration of the shaft 20 there is also the fact that not only is the actual value 30 prone to errors, but that the error has a periodicity. A control of the rotational speed of the grinding table 12 formed with an actual value prone to a periodic error conceals the danger of exciting the entire system, i.e. the vertical mill 10, into vibrations, which at least in the resonance position, can have damaging consequences for the system.

For the circumstances shown in FIG. 2 the following relationships supply:

A distance s measured in relation to a measuring scale attached to the outer surface of the shaft 20 is dependent on the respective speed $\omega$, the time t and the radius r of the shaft:

$$s = \omega t \cdot r$$

With an eccentricity e of the shaft 20, because of the eccentricity, a periodic error component $F_E$ is also measured:

$$s = \omega t \cdot r + F_E$$

with $$F_E = \sin(\omega t) \cdot \left(1 - \frac{r+e}{r}\right)$$

The respective circumferential speed is then produced as a first temporal derivation of the measured distance:

$$v = \frac{ds}{dt} = \omega \cdot \left(r + \cos(\omega t) \cdot \left[\frac{r+e}{r}\right]\right)$$

The circumferential speed thus measured, which would thus conventionally be used as an actual value 30 for the rotational speed of the shaft 20 and subsequently for controlling the rotational speed of the shaft 20, includes the following periodic component:

$$\cos(\omega t) \cdot \left(1 - \frac{r+e}{r}\right)$$

Usual drive speeds of a vertical mill 10 lie the range of 780 rpm to 1,100 rpm. These rotational speeds correspond to rotation frequencies of $\omega=13$ Hz to $\omega\approx18$ Hz. This is also the frequency of the above periodic component of the measured circumferential speed or of the periodic error component $F_E$. On the other side typical inherent frequencies of the drive train of a vertical mill 10 likewise lie in this range and would be excited into oscillation by such a measurement error. The reason for this is that for the control actual variations of the rotational speed of the shaft are not able to be distinguished from the periodic error contained in the measured actual value 30 for the rotational speed and the control attempts accordingly to remove the periodic error. Because of the overlapping of the rotational frequency range and the inherent frequency range, the result in such cases is that the control amplifies such variations and thus adds to a resonance.

Figure 4:
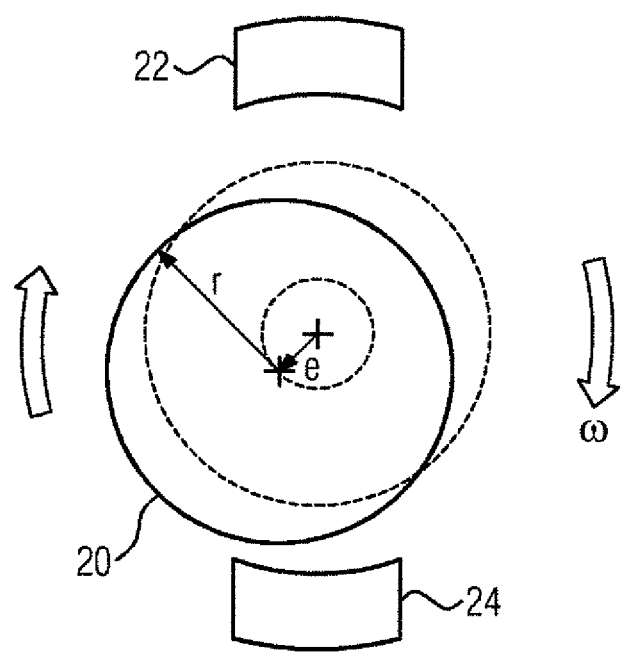
FIG. 4 shows an arrangement with a first and at least one further sensor for detecting the rotational speed of the shaft in accordance with the approach proposed here and FIG. 5 shows a schematically simplified presentation of a device to compensate for faults in the detection of a rotational speed of a shaft in accordance with the approach proposed here.

The diagram in FIG. 4 shows in a schematically simplified manner the principle of the solution proposed here. Exactly like conventional systems (FIG. 2, FIG. 3) the shaft 20 is assigned a sensor 22 here which, to differentiate it, is referred to as the first sensor 22. As well as this first sensor 22, the shaft 20 is assigned at least one further sensor 24 (compare also the diagram in FIG. 1). Each sensor 22, 24 delivers a—possibly error-prone—measured value of the rotational speed of the shaft 20. On assumption of a measurement error as a result of an eccentricity of the shaft 20 and the positioning of the sensors 22, 24 shown, with the relationships already explained above, the measured values delivered by the two sensors 22, 24 are as follows:

$$v_1 = \omega \cdot \left(r + \cos(\omega t) \cdot \left[1 - \frac{r+e}{r}\right]\right)$$

$$v_1 = \omega \cdot \left(r + \cos(\omega t + \pi) \cdot \left[1 - \frac{r+e}{r}\right]\right) = \left(r - \cos(\omega t) \cdot \left[1 - \frac{r+e}{r}\right]\right)$$

It can consequently be recognized that, for an addition of v1 and v2, the two periodic components contained in the measured values cancel each other out precisely.

Accordingly $$v = \frac{v_1 + v_2}{2} \omega \cdot r$$

delivers precisely the actual, error-free rotational speed of the shaft 20. An actual value 30 for the rotational speed of the shaft 20 formed in this way can be used for controlling the rotational speed of the shaft 20 and also for a highly-dynamic control of the rotational speed of the shaft 20 without having to worry that eccentricity errors and the like leading to an undesired variation of the speed of the shaft or even to vibration of the system as a whole.

Instead of precisely two sensors 22, 24, which are disposed on the shaft 20 lying opposite one another (FIG. 4), the use of more than two sensors (not shown) is also considered. In any event two or more sensors 22, 24, i.e. a first sensor 22 and each further sensor 24, are distributed in an equidistant arrangement along the outer circumference of the shaft 20 and the actual value 30 of the rotational speed is produced from the arithmetic mean of individual measured rotational speed values obtained by the first and the at least one further sensor 22, 24:

$$v = \frac{v_1 + \ldots + v_n}{n} \omega \cdot r$$

With the equidistant arrangement along the circumference of the shaft 20, two sensors 22, 24 are spaced at 360°/2=180°, three sensors are spaced at 360°/3=120° and n sensors are accordingly spaced at 360°/n.

The formation of the arithmetic mean of individual measured rotational speed values obtained from the first and the at least one further sensor 22, 24 described here is an example for a weighted overall view of the individual measured rotational speed values obtained from the first and the at least one further sensor 22, 24, since for the formation of the arithmetic mean all measured rotational speed values are equally weighted and the overall view is undertaken by the sum of all measured rotational speed values being divided by the number of the measured rotational speed values.

For the circumstances shown in FIG. 3 (radial vibration of the shaft 20) what has been stated above applies correspondingly. The respective error results there from a different type of positional deviation of the shaft 20 i.e. for example play in the bearings or flexing, and to distinguish it from the eccentricity error $F_E$, is referred to as $F_L$:

$$s = \omega t \cdot r + F_L$$

The error $F_L$ is essentially a random variable and the rotational speed is produced as $$v = \frac{ds}{dt} = \omega \cdot r + \frac{dF_L}{dt}$$

wherein the temporal derivation of the error $F_L$ is noise of which the maximum frequency is produced from the duration of the sampling interval. For a sampling interval of for example 250 µs a noise spectrum of up to 2 kHz is produced. This can result in a wide-band excitation of the overall system. Such an error is also compensated for by at least one further sensor 24 as well as the first sensor 22 and the weighted overall view of two or more measured values delivered by the first and the at least one further sensor 22, 24.

The formation of the arithmetic mean or of any otherwise suitable weighted overall view of two or more measured speed values delivered by a first sensor and at least one further sensor 22, 24 thus causes faults to be compensated for, for example faults resulting from vibrations and/or eccentricity—as described above—in the detection of a rotational speed of a shaft 20. Accordingly a first and at least one further sensor 22, 24 can also be combined in a device for compensating for faults in the detection of a rotational speed of the shaft 20.

Figure 5:
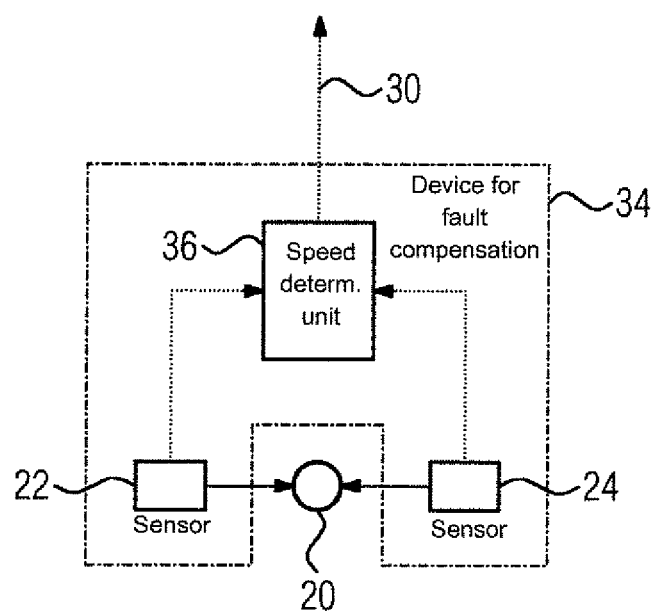

The diagram in FIG. 5 shows a schematically simplified diagram of such a device 34. This includes, as well as the first and at least one further sensor 22, 24, a speed measurement determination unit 36. This leads as a result of an implementation in software, hardware and/or firmware, to a weighted overall view of the measured values obtainable from the individual sensors 22, 24. For example the speed measurement determination unit 36 undertakes the weighted overall view of the individual measured values, by forming the arithmetic mean of the individual measured values. As a result an error-free actual value 30 for the speed measured value is output.

Although the invention has been illustrated and described in greater detail by the exemplary embodiment, the invention is not restricted by the disclosed examples and other variations can be derived herefrom by the person skilled in the art, without departing from the scope of protection of the invention.

Individual prominent aspects of the description submitted here can thus be summarized briefly as follows: A method and a corresponding device for controlling a rotational speed of a drive driving a shaft 20 are described, wherein the rotational speed is controlled by means of the control device 26 which is supplied with a control deviation calculated from a desired value 28 and an actual value 30 for the rotational speed, wherein the actual value 30 for the rotational speed of the shaft 20 is detected at the shaft 20 by means of a first sensor 22 and at least one further sensor 24 and wherein the actual value 30 is formed on the basis of a weighted overall view of the individual measured rotational speed values obtained from the first and the at least one further sensor 22, 24.

What is claimed is:

1. A method for controlling a rotational speed of a heavy-duty drive driving a rotating shaft, comprising:

measuring on the rotating shaft with at least two sensors, including a first sensor and at least one additional sensor spaced from one another along an outer circumference of the rotating shaft, an actual value of an angle of rotation of the rotating shaft or a time derivative thereof;

forming an actual value of the rotational speed of the rotating shaft based on a weighted average of individual measured values obtained from the first sensor and the at least one additional sensor;

calculating a control deviation of the rotational speed of the rotating shaft from a predetermined desired value for the rotational speed of the shaft and the actual value for the rotational speed of the shaft based on the weighted average of the individual measured values obtained from the first sensor and the at least one additional sensor; and supplying the calculated control deviation to a control device configured to control the rotational speed of the rotating shaft.

2. The method of claim 1, wherein the sensors are arranged substantially opposite to one another.

3. A device for controlling a rotational speed of a heavy-duty drive driving a rotating shaft, comprising:

at least two sensors including a first sensor and at least one additional sensor assigned to the shaft so that they are spaced from one another along an outer circumference of the rotating shaft, each sensor configured to measure an angle of rotation of the rotating shaft or a time derivative thereof, and a control device configured to form an actual value of the rotational speed of the rotating shaft based on a weighted average of individual measured values obtained from the first sensor and the at least one additional sensor, to calculate a control deviation of the rotational speed of the rotating shaft from a predetermined desired value for the rotational speed of the rotating shaft and the actual value for the rotational speed of the rotating shaft based on the weighted average of the individual measured values obtained from the first sensor and the at least one additional sensor; and to control the rotational speed of the rotating shaft based on the calculated control deviation.

4. The device of claim 3, wherein the first sensor and the at least one additional sensor are equidistantly distributed along an outer circumference of the shaft and the actual value of the rotational speed is formed as an arithmetic mean from individual measured rotational speed values obtained from the first and the at least one additional sensor.

5. The device of claim 3, wherein the sensors are arranged substantially opposite to one another.

6. The device of claim 4, wherein precisely one additional sensor is provided in addition to the first sensor, and wherein the precisely one additional sensor is arranged on the shaft opposite the first sensor.

7. The device of claim 6, wherein the precisely one additional sensor is arranged exactly opposite the first sensor.

8. A method for compensating for faults in a measurement of a rotational speed of a rotating shaft of a heavy-duty drive with at least two sensors including a first sensor and at least one additional sensor assigned to the rotating shaft so that they are spaced from one another along an outer circumference of the rotating shaft, the method comprising forming a measured value for the rotational speed of the rotating shaft based on a weighted average from individual measured values obtained from the first sensor and the at least one additional sensor.

9. The method of claim 8, wherein the sensors are arranged substantially opposite to one another.

10. A device for compensating for faults in a measurement of a rotational speed of a rotating shaft of a heavy-duty drive with at least two sensors including a first sensor and at least one additional sensor assigned to the rotating shaft so that they are spaced from one another along an outer circumference of the rotating shaft and located substantially opposite to one another, the device configured to form a measured value for the rotational speed of the rotating shaft based on a weighted average from individual measured values obtained from the first sensor and the at least one additional sensor.

11. The device of claim 10, wherein the sensors are arranged substantially opposite to one another.

* * * * *